(No Model.)

L. BRENIZER.
WIRE FENCE.

No. 259,803. Patented June 20, 1882.

WITNESSES
F. M. Burnham.
Geo. Binkenburg

INVENTOR
Levi Brenizer
By Daniel Breed
ATTORNEY

N. PETERS, Photo-Lithographer, Washington, D. C.

UNITED STATES PATENT OFFICE.

LEVI BRENIZER, OF MOUNT VERNON, IOWA.

WIRE FENCE.

SPECIFICATION forming part of Letters Patent No. 259,803, dated June 20, 1882.

Application filed December 2, 1881. (No model.)

*To all whom it may concern:*

Be it known that I, LEVI BRENIZER, a citizen of the United States, residing at Mount Vernon, in the county of Linn and State of Iowa, have invented certain new and useful Improvements in Wire Fences in combination with Live Posts or Standards, of which the following is a specification, reference being had therein to the accompanying drawings.

My invention consists of a novel construction of fence having posts and wires in combination with live posts or standards, such as growing corn in rows, all as will be hereinafter fully described, and specifically designated in the claims.

Figure 1:
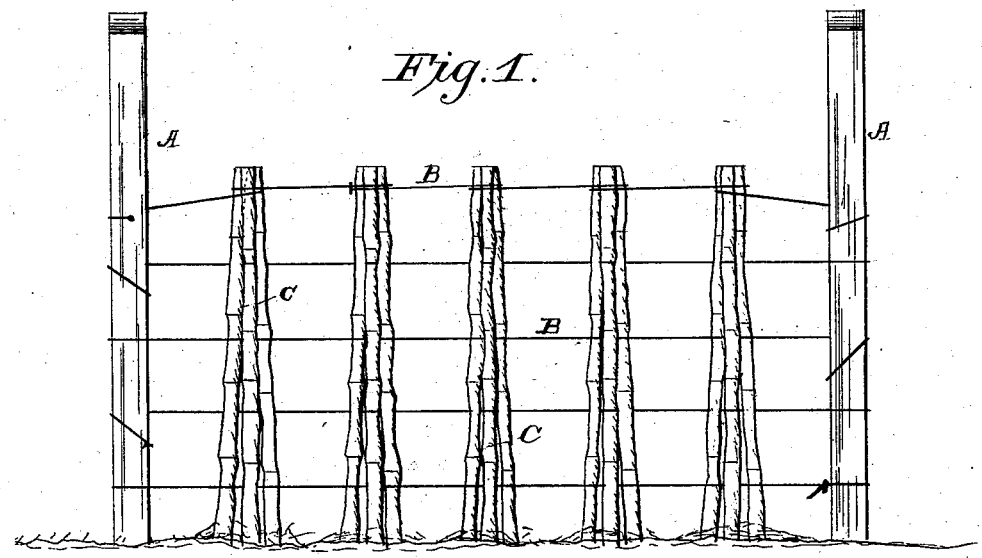
Figure 2:
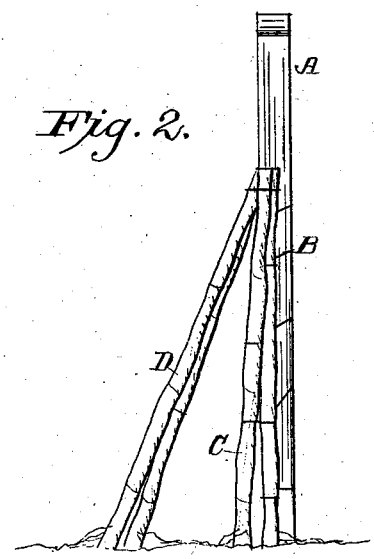

In the accompanying drawings, Figure 1 is a side view of my invention; Fig. 2, a cross-section thereof.

In the drawings, Fig. 1 is a side view of one form of my fence, the same being intended for dividing corn-fields where it is desired to let hogs or cattle feed on the green corn in part of a field and shut them out of the remainder thereof.

In constructing my new fence I set the posts A at each end of the field, or, if need be, at shorter intervals along in the line of a row of corn. I then take wires B, which may be barbed, if desired, and attach one end to one of these posts, and then interweave the wires with the cornstalks C, the tops of which are cut off at a proper height for the fence, and the green leaves plucked off so that cattle will not browse or feed on the fence. I will use more or less wires, as the case may be, so as to stop hogs or other cattle. The wires are properly stretched and the ends fastened.

In order to brace the fence, or a single row of cornstalks, a second row of stalks is bent over, as seen at D, Fig. 2, and the tops of two rows fastened together by wires. The braces D are always placed on the side of the fence from which the live-stock is shut out. I have tried a double series of braces, one on each side of the main row of cornstalks; but I prefer the single series on one side of the main row.

I have tried the above-described fence and find the same will stop hogs and other cattle, as a cheap and temporary fence.

Having described my invention, what I claim is—

1. A fence having the posts A and wires B, in combination with rows of growing cornstalks C, substantially as set forth.

2. A fence having the posts A and wires B, in combination with rows of growing cornstalks C, and rows of growing cornstalks bent over to form braces D for the rows of cornstalks C, substantially as herein shown and described.

In testimony whereof I affix my signature in presence of two witnesses.

LEVI BRENIZER.

Witnesses:
E. D. WALN,
JESSE BEECHLEY.